United States Patent
Shin et al.

(10) Patent No.: US 11,461,022 B2
(45) Date of Patent: Oct. 4, 2022

(54) MEMORY SYSTEM, MEMORY CONTROLLER, AND OPERATION METHOD OF MEMORY CONTROLLER FOR SCHEDULING COMMANDS BASED ON POWER CONSUMPTION

(71) Applicant: SK hynix Inc., Gyeonggi-do (KR)

(72) Inventors: Won Gyu Shin, Gyeonggi-do (KR); Jung Hyun Kwon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/222,429

(22) Filed: Apr. 5, 2021

(65) Prior Publication Data
US 2022/0113882 A1 Apr. 14, 2022

(30) Foreign Application Priority Data
Oct. 13, 2020 (KR) .................. 10-2020-0131707

(51) Int. Cl.
*G06F 3/06* (2006.01)
*G06F 13/16* (2006.01)

(52) U.S. Cl.
CPC .......... *G06F 3/0625* (2013.01); *G06F 3/0653* (2013.01); *G06F 3/0659* (2013.01); *G06F 3/0673* (2013.01); *G06F 13/1668* (2013.01)

(58) Field of Classification Search
CPC ..... G06F 3/0625; G06F 3/0659; G06F 3/0653
See application file for complete search history.

(56) References Cited

U.S. PATENT DOCUMENTS

| | | | |
|---|---|---|---|
| 10,693,787 B2 | 6/2020 | Schneider et al. | |
| 2014/0108773 A1* | 4/2014 | Jagatheesan | G06F 9/4401 713/1 |
| 2016/0350152 A1* | 12/2016 | Gadelrab | G06F 9/46 |
| 2017/0192722 A1* | 7/2017 | Erez | G06F 1/3221 |
| 2019/0065086 A1* | 2/2019 | Margetts | G06F 3/0659 |

* cited by examiner

*Primary Examiner* — David E Martinez
(74) *Attorney, Agent, or Firm* — IP & T Group LLP

(57) ABSTRACT

A memory system may comprise a memory; and a memory controller configured to issue, to the memory, commands scheduled in a first scheme when power consumption of the memory is less than a first threshold and commands scheduled in a second scheme when the power consumption is not less than the first threshold and less than a second threshold, and stop the issuance of the commands to the memory when the power consumption of the memory is not less than the second threshold.

13 Claims, 2 Drawing Sheets

MEMORY SYSTEM, MEMORY CONTROLLER, AND OPERATION METHOD OF MEMORY CONTROLLER FOR SCHEDULING COMMANDS BASED ON POWER CONSUMPTION

CROSS-REFERENCE TO RELATED APPLICATIONS

The present application claims priority to Korean Patent Application No. 10-2020-0131707, filed on Oct. 13, 2020, which is herein incorporated by reference in its entirety.

BACKGROUND

1. Field

The disclosure relates to a memory system including a memory and a memory controller that controls the memory.

2. Description of the Related Art

There is recently a vigorous research effort to replace DRAM and flash memory with next-generation memory. One of these next-generation memories is a resistive memory using a material that may rapidly change its resistance according to an applied bias and thus switch between at least two different resistance states, that is, a variable resistance material. Representative examples of those memories include phase-change random access (PCRAM), resistive random access memory (RRAM), magnetic random access memory (MRAM), and ferroelectric random access memory (FRAM).

In particular, the resistive memory constitutes a memory cell array in a cross point array structure. The cross point array structure refers to a structure in which a plurality of lower electrodes (e.g., a plurality of row lines (word lines)) and a plurality of upper electrodes (e.g., a plurality of column lines (bit lines)) are formed to cross each other, and a memory cell in which a variable resistance element and a selection element are connected in series is disposed at each of the intersections.

Power throttling is applied to resistive memory. Power throttling may be operated in such a manner as to decrease the power consumption and temperature of the resistive memory by blocking a command issue to the resistive memory when the power consumption of the resistive memory exceeds a threshold.

SUMMARY

Embodiments of the present disclosure may provide a memory system that uses power throttling and does not significantly degrade quality of service (QoS).

According to an embodiment of the present disclosure, a memory system comprises a memory; and a memory controller configured to issue, to the memory, commands scheduled in a first scheme when power consumption of the memory is less than a first threshold and commands scheduled in a second scheme when the power consumption is not less than the first threshold and less than a second threshold, and stop the issuance of the commands to the memory when the power consumption of the memory is not less than the second threshold.

According to an embodiment of the present disclosure, a memory controller comprises a power tracking unit configured to monitor power consumption of a memory; and a scheduler configured to determine a scheme for scheduling operations to be performed by the memory according to a result of the monitoring by the power tracking unit.

According to an embodiment of the present disclosure, a method for operating a memory controller comprises scheduling commands to be issued to a memory based on a performance-oriented scheduling scheme; identifying that power consumption of the memory is not less than a sub threshold; switching the scheduling scheme to a QoS-oriented scheduling scheme in response to the identification; and scheduling the commands to be issued to the memory based on the switched scheduling scheme.

According to an embodiment of the present disclosure, an operating method of a controller, scheduling to-be-performed operations on a round-robin (RR) basis when power consumption of a memory is below a first threshold and on a first-come-first-served (FCFS) basis when the power consumption is the first threshold or greater; and interrupting providing the memory with commands according to the scheduled operations when the power consumption is over a second threshold greater than the first threshold.

According to embodiments of the present disclosure, it is possible to reduce a decrease in quality of service (QoS) due to the use of power throttling in a memory system.

DETAILED DESCRIPTION

Hereinafter, various embodiments of the present disclosure are described below in detail with reference to the accompanying drawings to allow one of ordinary skill in the art to readily practice the technical spirit of the disclosure. Well known components or elements irrelevant to the subject matter of the disclosure may be omitted from the description. The same or substantially the same reference denotations are used to refer to the same or substantially the same elements throughout the specification and the drawings.

Figure 1:
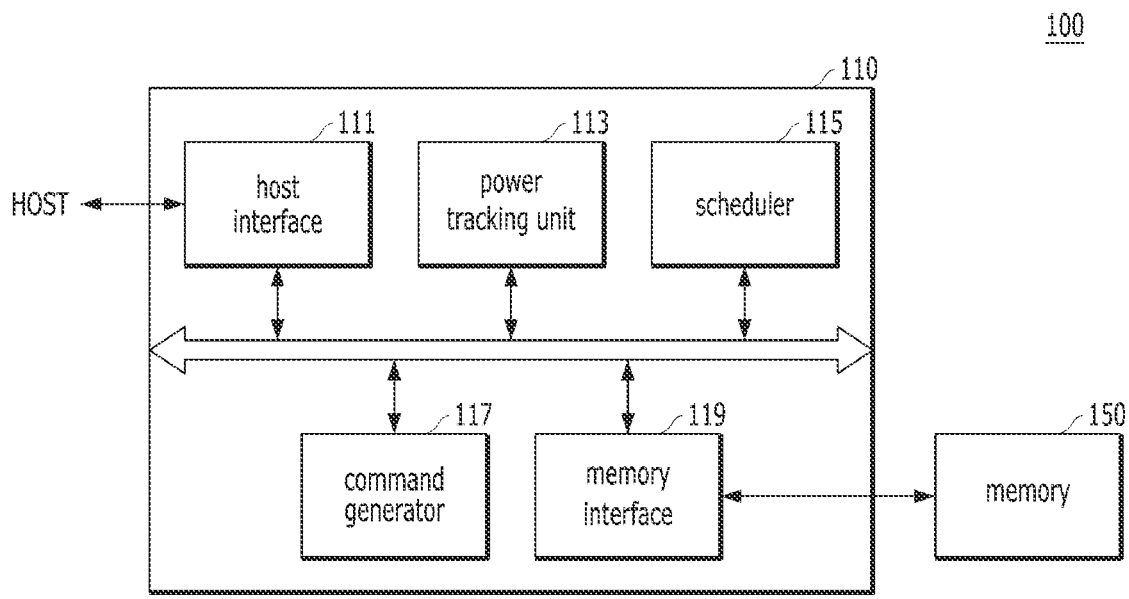
FIG. 1 is a view illustrating a configuration of a memory system 100 according to an embodiment of the present disclosure.

FIG. 1 is a view illustrating a configuration of a memory system 100 according to an embodiment of the present disclosure.

Referring to FIG. 1, a memory system 100 may include a memory controller 110 and a memory 150.

The memory controller 110 may control various operations of the memory 150, for example, read and write operations, according to a request of a host HOST. The memory 150 may perform various operations indicated by the memory controller 110. The memory 150 may be one of all types of memories. For example, the memory may be one of resistive memories, such as phase-change random access memory (PCRAM), resistive random access memory (RRAM), magnetic random access memory (MRAM), and ferroelectric random access memory (FRAM), or the memory may be either a NAND flash or DRAM, rather than a resistive memory.

The memory controller 110 may include a host interface 111, a power tracking unit 113, a scheduler 115, a command generator 117, and a memory interface 119.

The host interface 111 may serve as an interface between the memory controller 110 and the host HOST. Requests from the host, addresses and data corresponding to the requests may be received through the host interface 111, and processing results of the requests may be transmitted to the host HOST. The host interface 111 may be one of PCI-EXPRESS (PCIe), cache coherent interconnect for accelerators (CCIX), dual in-line memory module (DIMM), or other various types of interfaces.

The power tracking unit 113 may monitor the power consumption of the memory 150. The power tracking unit 113 may monitor the power consumption of the memory 150 based on a command applied to the memory 150 within a predetermined time window. For example, it is possible to determine how much power the memory 150 consumes based on the type and number of commands applied to the memory 150 during a predetermined period of time (e.g., 500 ns).

The scheduler 115 may schedule operations to be performed by the memory 150. For example, when five requests A, B, C, D, and E are received from the host HOST through the host interface 111, the scheduler 115 may schedule the order of the requests A, B, C, D, and E, according to which memory 150 is to perform the operations.

A scheduling scheme of the scheduler 115, that is, a scheduling algorithm, may be changed based on the monitoring of the power tracking unit 113. When the power consumption of the memory 150 is less than a first threshold as a result of monitoring by the power tracking unit 113, the scheduler 115 may schedule the requests in a first scheme. Here, the first scheme or a performance-oriented scheme refers to a scheduling scheme that gives much weight to the performance of the memory system 100, and an example of the performance-oriented scheduling scheme may include a round robin (RR) scheme.

When the power consumption of the memory 150 is greater than or equal to the first threshold, the scheduler 115 may schedule the requests in a second scheme. The second scheme or a QoS-oriented scheme refers to a scheduling scheme that emphasizes the quality of service (QoS) of the memory system 100, and an example of the QoS-oriented scheduling scheme may be a first-come-first-served (FCFS) scheme.

When the power consumption of the memory 150 is not less than a second threshold, scheduling of the requests may be stopped. The second threshold may be a reference value for power throttling of the memory 150. In other words, when the power consumption of the memory 150 is greater than or equal to the second threshold, issuance of a command from the memory controller 110 to the memory 150 is stopped, and scheduling of the scheduler 115 may also be stopped. Since a stop of issuance of a command to the memory 150 is of significance in power throttling, even when the power consumption of the memory 150 is greater than or equal to the second threshold, only the command issuance may be stopped and the scheduling of the scheduler 115 may continue. The first threshold may be lower than the second threshold. For example, when the first threshold is a value representing the power consumption of 100, the second threshold may be a value representing the power consumption of 80 or 90.

The first scheme is the performance-oriented scheduling scheme that emphasizes the performance of the memory system 100, and the second scheme is the QoS-oriented scheduling scheme that emphasizes the quality of service (QoS) of the memory system 100, which may be a relative concept. The first scheme may be the performance-oriented scheduling scheme that more emphasizes performance when compared to the second scheme, and the second scheme may be the QoS-oriented scheduling scheme that more emphasizes quality of service when compared to the first scheme. For example, the first scheme may be an FCFS-RR scheme in which FCFS and RR are combined, and the second scheme may be an FCFS scheme that is low in performance but high in quality of service (QoS) as compared to FCFS.

Table 1 below summarizes the scheduling schemes of the scheduler 115 that are switched according to the power consumption of the memory 150.

TABLE 1

| Power consumption | less than the first threshold | not less than the first threshold | not less than the second threshold |
|---|---|---|---|
| Scheduling scheme | performance-oriented scheduling | QoS-oriented scheduling | Scheduling stopped |

The command generator 117 may generate commands to be applied to the memory 150 according to an order of the operations scheduled by the scheduler 115.

The memory interface 119 may serve as an interface between the memory controller 110 and the memory 150. The memory interface 119 may transfer a command generated by the command generator 117 and an address corresponding to the command to the memory 150 and transmit and receive data to/from the memory 150.

Figure 2:
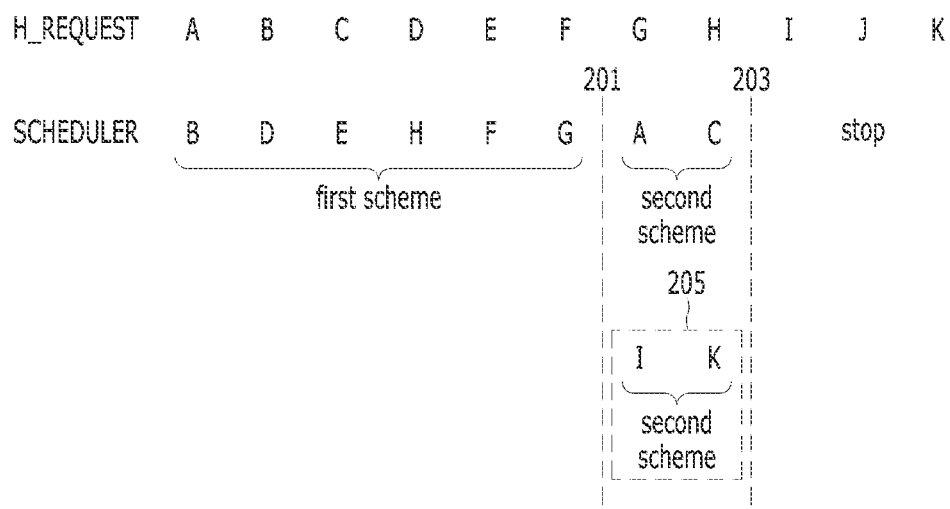
FIG. 2 is a view illustrating a scheduling operation of a scheduler 115.

FIG. 2 is a view illustrating a scheduling operation of a scheduler 115.

'H_REQUEST' in FIG. 2 indicates requests transmitted from the host HOST to the memory controller 110. Referring to FIG. 2, it may be identified that requests are transferred from the host HOST in the order of A, B, C, D, E, F, G, H, I, J, and K. The requests A to K may differ in at least one or more of the type of operation to be performed by the memory 150 and the address where the operation is to be performed in the memory 150.

'SCHEDULER' of FIG. 2 indicates the processing order of the requests scheduled by the scheduler 115. '201' denotes a timing when the power consumption of the memory 150 becomes the first threshold or more. Until the timing '201' is reached, the scheduler 115 may schedule the requests in the first scheme or the performance-oriented scheme. Since the scheduler 115 schedules the requests in the performance-oriented first scheme, the order of processing of requests may be different from the order in which requests are delivered from the host HOST. Referring to the drawings, it may be identified that the requests are scheduled to be processed in the order of B, D, E, H, F, and G.

Since the power consumption of the memory 150 becomes the first threshold or more at the timing '201,' the scheduler 115 may schedule the requests in the second scheme or the QoS-oriented scheme, from the timing '201.' From '201,' old requests A and C may be scheduled to be processed for quality of service (QoS). When the power consumption of the memory 150 becomes the first threshold or more, it is likely that the power throttling of the memory 150 starts soon and the command issuance to the memory 150 is stopped. Thus, it may be necessary to switch the scheduling scheme to the second scheme to thereby process the old requests (e.g., A and C) and to prevent serious degradation of QoS.

'203' denotes a timing when the power consumption of the memory 150 becomes the second threshold or more. At the timing '203,' the issuance of the command to the memory is stopped, so that the scheduling of the scheduler may also be stopped.

'205' of FIG. 2 indicates requests scheduled under the assumption that the scheduler 115 schedules the requests in the first scheme even after the timing '201.' Referring to '205,' it may be identified that requests I and K are scheduled after the timing '201.' In this case, when scheduling is stopped after the timing '203', the old requests A and C may not be processed for a very long time, causing serious deterioration of quality of service (QoS).

Figure 3:
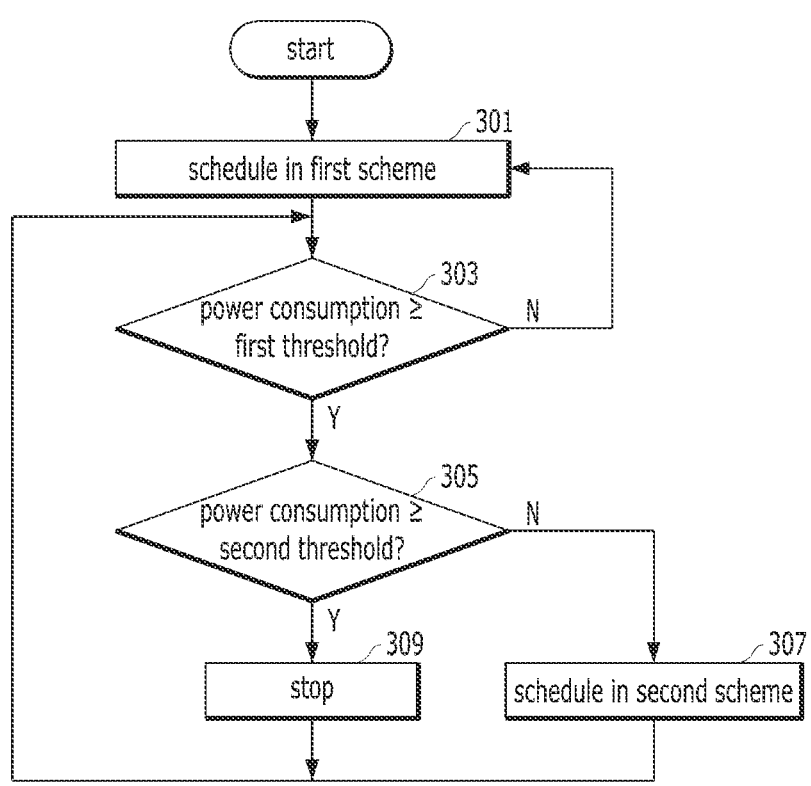
FIG. 3 is a flowchart illustrating operations of a memory controller 110.

FIG. 3 is a flowchart illustrating operations of a memory controller 110.

Referring to FIG. 3, the scheduler 115 of the memory controller 110 may schedule requests in the first scheme or the performance-oriented scheme (301). The command generator 117 may generate commands based on the requests scheduled by the scheduler 115 and the commands may be applied to the memory 150 through the memory interface 119.

When the power consumption of the memory 150 monitored by the power tracking unit 113 is greater than or equal to the first threshold (Y in 303) and not greater than the second threshold (N in 305), the scheduling scheme of the scheduler 115 may be switched from the first scheme to the second scheme or the QoS-oriented scheme, and scheduling may be performed on the basis of the QoS-oriented scheme (307). The command generator 117 may generate commands based on the requests scheduled by the scheduler 115 and the commands may be applied to the memory 150 through the memory interface 119.

When the power consumption of the memory 150 monitored by the power tracking unit 113 is greater than or equal to the second threshold (Y in 305), the scheduling operation of the scheduler 115 is stopped (309), and the command generation by the command generator 117 and command application to the memory 150, by the memory interface 119, may be stopped.

Thereafter, when the power consumption of the memory 150 falls below the second threshold, the scheduling operation of the scheduler 115 may resume.

Referring to FIG. 3, the scheduler 115 may schedule requests from the host HOST in the first scheme or the performance-oriented scheme, as default. When the power consumption of the memory 150 becomes the first threshold or more, and power throttling is highly likely, the requests from the host HOST may be scheduled according to the QoS-oriented second scheme so as to prevent a significant fall in QoS. When the power consumption of the memory 150 becomes the second threshold or more, power throttling may be started, and scheduling and application of commands to the memory 150 may be stopped.

It should be noted that although the technical spirit of the disclosure has been described in connection with preferred embodiments thereof, this is merely for description purposes and should not be interpreted as limiting. It should be appreciated by one of ordinary skill in the art that various changes may be made thereto without departing from the technical spirit of the disclosure.

While the present teachings have been illustrated and described with respect to the specific embodiments, it will be apparent to those skilled in the art in light of the present disclosure that various changes and modifications may be made without departing from the spirit and scope of the disclosure as defined in the following claims.

What is claimed is:

1. A memory system, comprising:
   a memory; and
   a memory controller configured to issue, to the memory, commands scheduled in a first scheme when power consumption of the memory is less than a first threshold and commands scheduled in a second scheme when the power consumption is not less than the first threshold and less than a second threshold, and stop the issuance of the commands to the memory when the power consumption of the memory is not less than the second threshold.

2. The memory system of claim 1, wherein the first scheme is a performance-oriented scheduling scheme, and the second scheme is a quality of service (QoS)-oriented scheduling scheme.

3. The memory system of claim 2, wherein the first scheme is a round robin (RR) scheme, and the second scheme is a first-come-first-served (FCFS) scheme.

4. The memory system of claim 1, wherein the memory controller includes:
   a power tracking unit configured to monitor the power consumption of the memory; and
   a scheduler configured to schedule operations to be performed by the memory selected from one of the first scheme and the second scheme according to a result of the monitoring by the power tracking unit.

5. The memory system of claim 4, wherein the memory controller further includes:
   a host interface configured to receive requests from a host, to be scheduled by the scheduler;
   a command generator configured to generate commands corresponding to the operations scheduled by the scheduler; and
   a memory interface configured to transfer the commands generated by the command generator to the memory.

6. A memory controller, comprising:
   a power tracking unit configured to monitor power consumption of a memory; and
   a scheduler configured to determine a scheme for scheduling operations to be performed by the memory according to a result of the monitoring by the power tracking unit
   wherein the scheduler determines, as the scheme for scheduling the operations, a performance-oriented scheduling scheme when the power consumption of the memory is less than a sub threshold as the result of the monitoring by the power tracking unit, and a QoS-oriented scheduling scheme when the power consumption of the memory is not less than the sub threshold as the result of the monitoring by the power tracking unit.

7. The memory controller of claim 6, wherein the memory controller stops issuing commands to the memory when the power consumption of the memory is not less than a threshold higher than the sub threshold as the result of the monitoring by the power tracking unit.

8. The memory controller of claim 6, wherein the performance-oriented scheduling scheme is a round robin (RR) scheme and the QoS-oriented scheduling scheme is a first-come-first-served (FCFS) scheme.

9. The memory controller of claim 6, further comprising a host interface configured to receive requests from a host, operations corresponding to the requests being scheduled by the scheduler;
   a command generator configured to generate commands corresponding to operations scheduled by the scheduler; and
   a memory interface configured to transfer the commands generated by the command generator to the memory.

10. A method for operating a memory controller, the method comprising:
    scheduling commands to be issued to a memory based on a performance-oriented scheduling scheme;
    identifying that power consumption of the memory is not less than a sub threshold;
    switching the scheduling scheme to a QoS-oriented scheduling scheme in response to the identification; and
    scheduling the commands to be issued to the memory based on the switched scheduling scheme.

11. The method of claim 10, further comprising:
    identifying that the power consumption of the memory is not less than a threshold higher than the sub threshold; and
    stopping issuing the commands to the memory.

12. The method of claim 10, wherein the performance-oriented scheduling scheme is a round robin (RR) scheme and the QoS-oriented scheduling scheme is a first-come-first-served (FCFS) scheme.

13. An operating method of a controller, the operating method comprising:
    scheduling to-be-performed operations on a round-robin (RR) basis when power consumption of a memory is below a first threshold and on a first-come-first-served (FCFS) basis when the power consumption is the first threshold or greater; and
    interrupting providing the memory with commands according to the scheduled operations when the power consumption is over a second threshold greater than the first threshold.

\* \* \* \* \*